United States Patent
Zeng et al.

(10) Patent No.: US 8,705,797 B2
(45) Date of Patent: Apr. 22, 2014

(54) ENHANCED DATA ASSOCIATION OF FUSION USING WEIGHTED BAYESIAN FILTERING

(75) Inventors: Shuqing Zeng, Sterling Heights, MI (US); Lufeng Shi, Warren, MI (US); Daniel Gandhi, Auburndale, MA (US); James N. Nickolaou, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 13/413,861

(22) Filed: Mar. 7, 2012

(65) Prior Publication Data
US 2013/0236047 A1 Sep. 12, 2013

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .......... 382/103, 107, 236, 287; 348/152, 154, 348/155, 169, 170, 171, 172, 352, 94, 348/208.1, 208.14, 208.16
See application file for complete search history.

(56) References Cited

U.S. PATENT DOCUMENTS

| | | | | |
|---|---|---|---|---|
| 6,989,754 | B2 * | 1/2006 | Kisacanin et al. | 340/576 |
| 7,477,758 | B2 * | 1/2009 | Piirainen et al. | 382/100 |
| 8,180,107 | B2 * | 5/2012 | Broaddus et al. | 382/103 |
| 2012/0154175 | A1 * | 6/2012 | Bandou et al. | 340/905 |

* cited by examiner

*Primary Examiner* — Abolfazl Tabatabai

(57) ABSTRACT

A method of associating targets from at least two object detection systems. An initial prior correspondence matrix is generated based on prior target data from a first object detection system and a second object detection system. Targets are identified in a first field-of-view of the first object detection system based on a current time step. Targets are identified in a second field-of-view of the second object detection system based on the current time step. The prior correspondence matrix is adjusted based on respective targets entering and leaving the respective fields-of-view. A posterior correspondence matrix is generated as a function of the adjusted prior correspondence matrix. A correspondence is identified in the posterior correspondence matrix between a respective target of the first object detection system and a respective target of the second object detection system.

20 Claims, 4 Drawing Sheets

ENHANCED DATA ASSOCIATION OF FUSION USING WEIGHTED BAYESIAN FILTERING

BACKGROUND OF INVENTION

An embodiment relates to object sensor fusion.

Vision-imaging systems are used in vehicles for enhancing applications such as object detection systems and other vision/positioning systems. Such systems utilize a camera to capture the image and then extract objects from the image. Such objects may be other vehicles, pedestrians, or even objects within a road of travel.

Radar systems are also used to detect objects within the road of travel. Radar systems utilize radio waves to determine the range, altitude, direction, or speed of objects. A transmitter transmits pulses of radio waves which bounce off any object in their path. The pulses bounced off the object returns a tiny part of the wave's energy to a receiver which is typically located at the same location as the transmitter.

Detecting objects by cooperatively utilizing vision-imaging systems and radar systems would add confidence as to the detection and position of an object in the path of travel of a vehicle. Data associated or data correspondence between different modalities may be readily performed when the vehicle is traveling along a flat, non-pitched road; however, if the road of travel is not flat or the road pitch changes abruptly due to the structure of the road or due to harsh braking, then fusion of the data from complementary sensors of different modalities becomes increasingly difficult.

SUMMARY OF INVENTION

An advantage of an embodiment is the integral merging of data from two separate object detection systems which reduces offsets between the two object detections system so that the positions of each may be merged for providing greater confidence as to the objects' positions in the road of travel. The technique described herein offer robust and accurate association of data from the different modalities. The technique provides special handling targets leaving and entering the field-of-view of each modality such that assumptions may be made as to the correspondence between the respective targets within the captured field-of-views. Moreover, the data association technique described herein may be utilized as a subsystem to a fusion architecture technique that fuses data from different sensors through target tracking An embodiment contemplates a method of associating targets from at least two object detection systems. An initial prior correspondence matrix is generated based on prior target data from a first object detection system and a second object detection system. Targets are identified in a first field-of-view of the first object detection system based on a current time step. Targets are identified in a second field-of-view of the second object detection system based on the current time step. The prior correspondence matrix is adjusted based on respective targets entering and leaving the respective fields-of-view. A posterior correspondence matrix is generated as a function of the adjusted prior correspondence matrix. A correspondence is identified in the posterior correspondence matrix between a respective target of the first object detection system and a respective target of the second object detection system.

DETAILED DESCRIPTION

Figure 1:
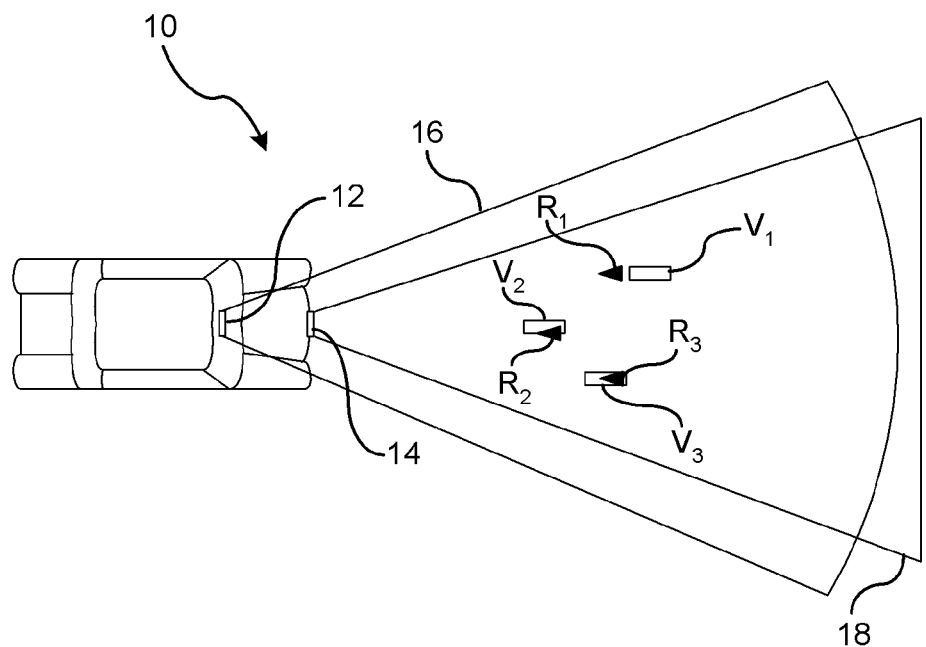
FIG. 1 is a schematic illustration of a vehicle equipped with object detection systems.

There is shown in FIG. 1 a vehicle 10 equipped with a first object detection system 12 and a second object detection system 14. Each system utilizes a different type of sensor to detect objects. Each sensor within each respective system is able to detect and track multiple targets in its respective field-of-view. For the exemplary purposes herein, the first object detection system 12 includes a vision-based system and the second object detection system 14 includes a radar-based system. It should be understood that the respective systems are exemplary and that any two or more different object detection systems may be used.

A field-of-view for the vision system 12 is shown generally at 16. A set of targets detected by the vision system 12 is identified as $V_1$, $V_2$, and $V_3$. Each respective target identified by vision system 12 includes measurements such as longitudinal displacement, lateral displacement, longitudinal velocity, and lateral velocity.

A field-of-view of the radar system 14 is shown generally at 18. A set of targets detected by the radar system 14 is identified as $R_1$, $R_2$, and $R_3$. Each respective target identified by vision system 12 includes measurables such as longitudinal displacement, lateral displacement, longitudinal velocity, and lateral velocity.

The idea is to determine a correspondence between radar targets and vision targets in their common field-of-view. FIG. 1 shows an example of a correspondence between the radar targets and the vision targets $V_1 \rightarrow R_1$, $V_2 \rightarrow R_2$, and $V_3 \rightarrow R_3$. Since the measurables constantly change due to change of vehicle direction, speed, and occlusion with other vehicles, the respective targets must be tracked by each respective detection system at each instant of time.

Accurate association of data from different modalities is significant for target tracking, however, data association is a challenging task. Targets of vision systems in certain situations, such as a non-flat road surface, curvatures, and abrupt pitch angle changes of the host vehicle (e.g., caused by either the road or harsh braking) may result in a deviation from their true value significantly. Therefore, a distance between the vision targets may be significantly large. A commonly known technique for the corresponding problem is a technique known as the nearest neighbor matching. In the nearest neighbor matching, for every radar target, each radar target is assigned to a vision target having the nearest distance to it. The issue with the nearest matching method is that the decision is based only on current data.

Figure 2:
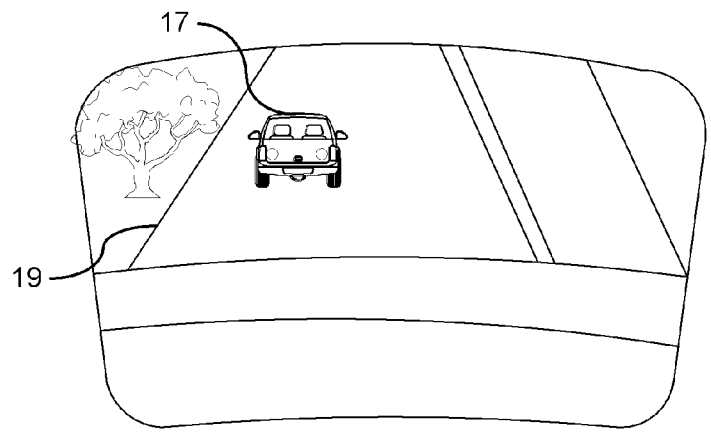
FIG. 2 is an exemplary image captured by a vehicle driven on a flat and straight road surface.
Figure 3:
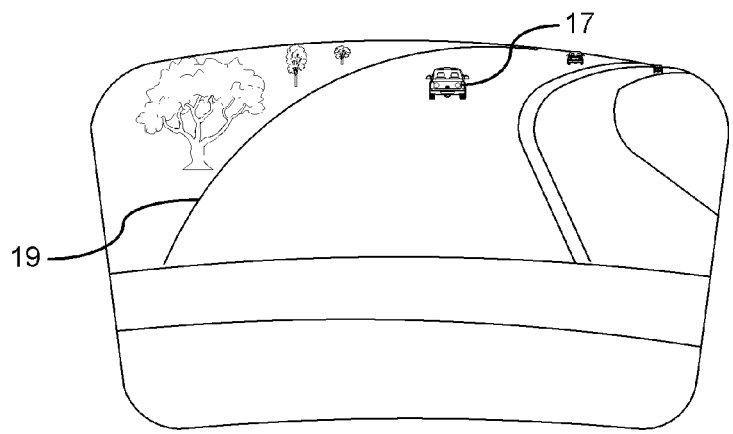
FIG. 3 is an exemplary image captured by a vehicle traveling along the curved and pitched road surface.
Figure 4:
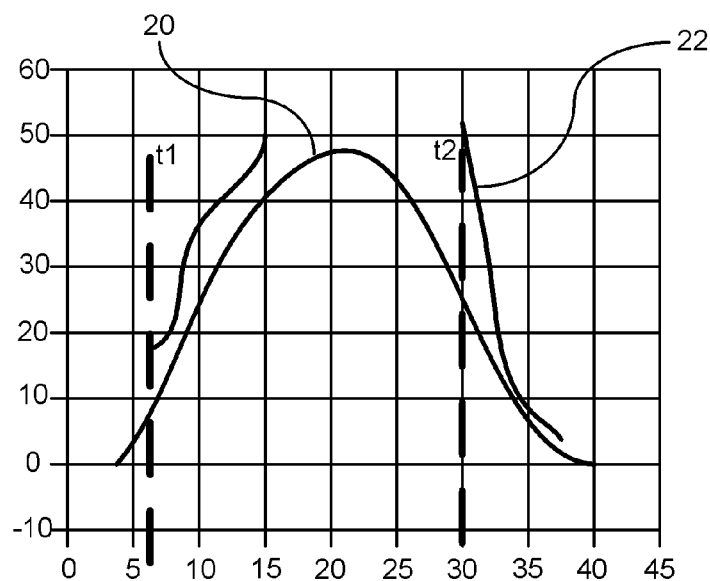
FIG. 4 is an exemplary target correspondence graph between a radar system and a vision system.

The nearest neighbor matching method fails for scenarios shown in FIGS. 2-4. FIG. 2 illustrates an image of a vehicle 17 driven on a flat and straight road surface 19 with no pitch changes at a time t1. Under such driving conditions, there is significant correspondence between the vision targets and radar targets in the time displaced images if the road of travel continued as a flat and straight road surface with no pitch changes.

FIG. 3 illustrates an image of the vehicle 17 traveling along the road of travel at a later time. As shown in the image, the road 19 includes pitch changes as well as curves. In addition to changes in the position of a vehicle captured within the image, the range to the target captured by the vision system becomes unpredictable. As shown in the graph illustrated in FIG. 4, a significant distance between radar target measurements and vision target measurements are cause by the non-flat and curved road surface. The y-axis represents distance and the x-axis represents time. The tracking of targets by the vision system is represented by 20 and the tracking of the target by the radar system is represented by 22. As shown in FIG. 4, the correspondence of the target between the vision system and the radar system is significant at time t1. That is, the target as determined by the vision system and the radar system are measured at a substantially same longitudinal range. As time elapses, correspondence between the target tracked by the radar system and the vision system deteriorates and the correspondence becomes increasingly uncertain. This is the result of the road transitioning from a straight and flat road surface to a pitched and non-flat road surface. Correspondence of the target between the vision system and radar system gains confidence only after a time period elapses from t2 (i.e., when the road of travel transitions to a consistent road surface). As shown in FIG. 4, there is a lapse in association in targets from time period t1 and t2.

The technique described herein overcomes the deficiencies of target association between radar systems and vision systems. To find a correspondence between radar targets and vision targets a Boolean matrix A of size M×N is maintained at each time step. M is the number of vision targets whereas N is the number of radar targets. The Boolean matrix A is updated at each step of time for re-determining which respective radar targets are associated with which respective vision targets. To identify a correspondence between a respective vision target $V_j$ and a respective radar target $R_k$, a match between a respective vision target $V_j$ and a respective radar target $R_k$ is identified when a correspondence element $a_{jk}=1$. It is assumed that each vision target only corresponds to at most one object. Therefore, for each N column in the Boolean matrix A, each column is summed and the largest summation is identified for a corresponding match between a respective vision target and a respective radar target. A formula for identifying whether there is a correspondence between a vision target and a radar target is represented as follows:

$$\sum_{k=1}^{N} a_{jk} = \begin{cases} 1 \\ 0 \end{cases} \tag{1}$$

where the sum is equal to 0 if $V_j$ is an outlier, and equal to 1 otherwise.

It is first assumed that there is a same set of targets in a sequence of captured images detected for the radar system and vision system. It is also assumed a tracker exists in each individual sensor. Based on target identity (i.e., the signal of a target identifier), historical matrices A(t−1), A(t−2), . . . , A(1), at time step t−1, t−2, . . . , 1, respectively, are known.

A rigid 2D transformation T is defined which is regarded as a transformation from a radar coordinate frame to the vision coordinate frame. $[T(R_k)]$ is defined as the radar target position at the vision coordinate frame. The radar targets ($R_1$, $R_2$, . . . , $R_N$) are modeled as Gaussian mixture model (GMM) distribution with parameters $\{R_k | k=1, \ldots, N\}$ where $R_k$ represents the measurement of location of the radar (i.e., longitudinal and lateral displacement of targets). The formula for the GMM with parameters can be represented by the formula:

$$p(v) = \sum_{k=1}^{N+1} \pi_k p(v|k) \tag{2}$$

where p(v|k) is the 2D Gaussian distribution, i.e., $$p(v|k) = \frac{1}{2\pi\sigma^2} \exp\left(-\frac{\|v - T(R_k)\|^2}{2\sigma^2}\right) \text{ for } k=1, \ldots, N \tag{3}$$

where v is the random variable of a possible vision target location, and σ is a standard deviation.

In another embodiment p(v|k) is the 2D Gaussian distribution, i.e., $$p(v|k) = \frac{1}{2\pi\sigma_x\sigma_y} \exp\left(-\frac{|x-x'|^2}{2\sigma_x^2} - \frac{|y-y'|^2}{2\sigma_y^2}\right) \text{ for } k=1, \ldots, N$$

where v=(x,y) is the random variable of a vision target location; x and y longitudinal and lateral offsets of the vision target, respectively; x' and y' are longitudinal and lateral offsets of the k-th projected radar target $T(R_k)$ in the vision system frame; and $\sigma_x$ and $\sigma_y$ are standard deviation in longitudinal and lateral directions, respectively. In this embodiment, several specific characteristics of vision system such as rough longitudinal measurement but accurate azimuth angle measurement can be modeled.

Given a vision target at range r, the standard deviation is set as $\sigma_x = \alpha r$ and $\sigma_y = \beta r$, respectively, where the constants α and β are determined by the performance specification of the vision system.

Next a component is modeled for noise or outliers as a uniform distribution which is represented by the formula:

$$p(x|N+1) = \frac{1}{\Gamma} \tag{4}$$

where Γ is the area of vision field-of-view. A coefficient for the GMM is represented by the formula:

$$\pi_k = \frac{1-w}{N}, \tag{5}$$

for k=1, . . . , N and $\pi_{N+1}=w$ where w denote the probability of a target being an outlier. The vision targets ($V_1, V_2, \ldots, V_M$) are viewed as independent and identically distributed samples of the GMM. The correspondence matrix can be treated as a Boolean random matrix. Each realization A represents the correspondences between radar and vision targets. This is verified as follows:

$$\bar{a}_{jk} = E(A_{jk}) = p(A_{jk}=1). \tag{6}$$

$\bar{a}_{jk}$ is the correspondence prior distribution which is usually set to be non-informative at time step 0. This assumes that each vision target is assigned to every radar target at equal probability at time step 0. This is represented by the formula:

$$\bar{a}_{jk}=\pi_k \text{ for all } j. \qquad (7)$$

Given the prior $\bar{a}_{jk}$, the posterior $\hat{a}_{jk}$, which is the resulting correspondence, can be computed. After the vision targets are observed $V=(V_1, V_2, \ldots, V_M)$ the posterior $\hat{a}_{jk}$ is represented by the following formula:

$$\hat{a}_{jk} = p(A_{jk}=1\,|\,V) = \frac{\bar{a}_{jk}\cdot p(V_j|k)}{\sum_{k=1}^{N+1}\bar{a}_{jk}\cdot p(V_j|k)}, \qquad (8)$$

$$\text{for } j=1,\ldots,M, k=1,\ldots,N$$

wherein $\hat{A}=[\hat{a}_{jk}]$ is the posterior probability of matrix, $p(V_j|k)$ is the probability that the j-th vision target $V_j$ is associated with the k-th target $R_k$, defined in Eq. (3), and $$\frac{1}{\sum_{k=1}^{N+1}\bar{a}_{jk}\cdot p(V_j|k)}$$

is the normalization factor to make $p(A_{jk}=1|V)$ a probability distribution.

As a result, the vision target $V_j$ is assigned to the $k_j$-th radar target where $k_j=\arg\max_k (\hat{a}_{jk})$. It should be noted that if $k_j=N+1$, then the vision target is an outlier and is not assigned to any radar target.

Figure 5:
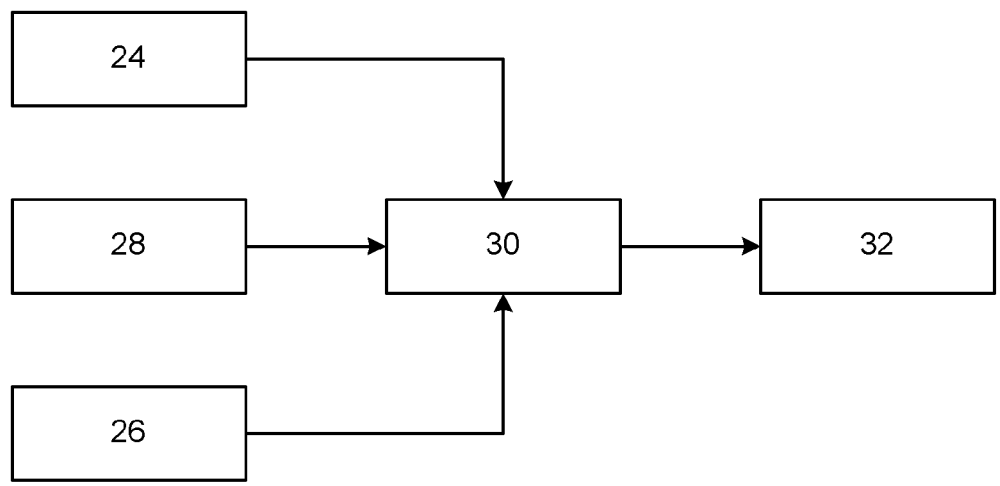
FIG. 5 is a block diagram illustrating the general concept of a target association technique.

FIG. 5 illustrates a block diagram illustrating the general concept of the target association technique. Detected radar target data 24 and vision target data 26 are input to a Bayesian framework model for data association inference at time t1. Also input to the Bayesian framework model 30 is the prior correspondence matrix ($\bar{A}$) 28 determined at a last time period. A recursive data association technique is applied to the input data for generating a posterior correspondence matrix ($\hat{A}$) 32. As a result, the posterior correspondence matrix ($\hat{A}$) 32 that is generated for the current time period is utilized as the prior correspondence at the next determination stage.

Figure 6:
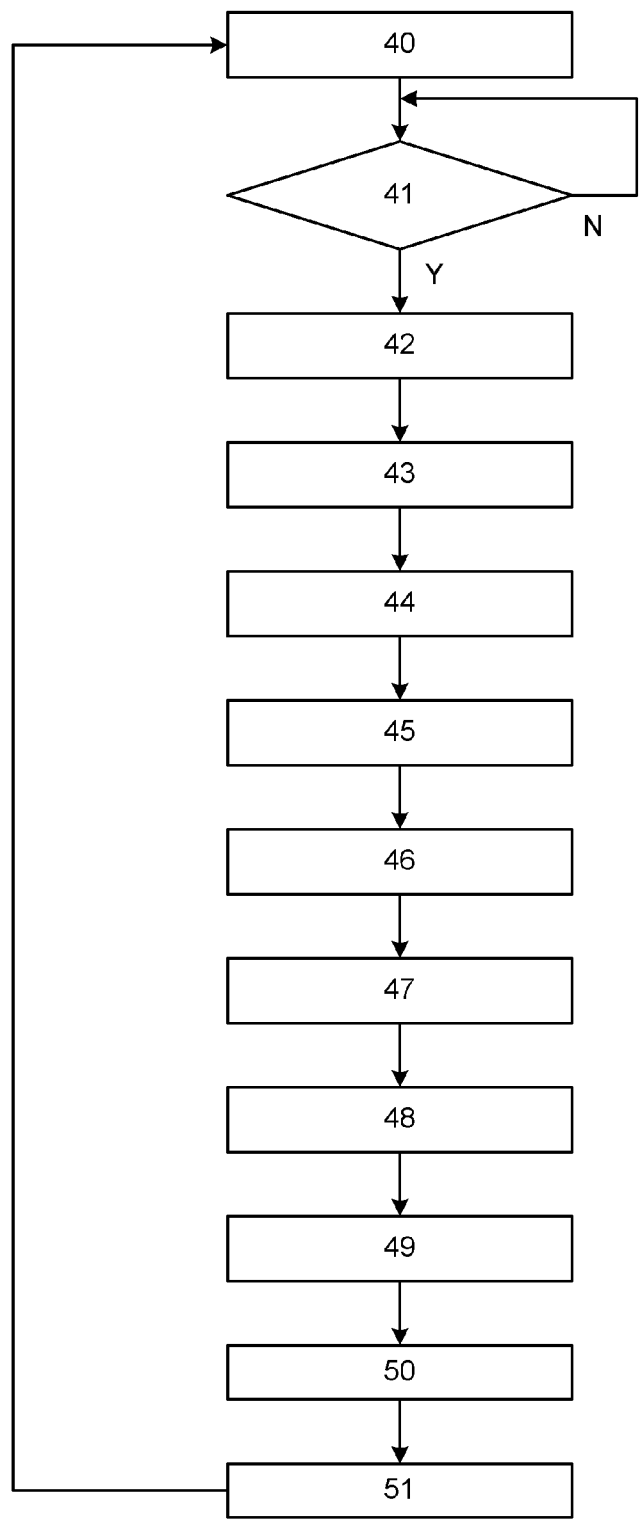
FIG. 6 is a flowchart of a method for the recursive target association technique.

FIG. 6 illustrates flowchart of a method for the recursive target association technique. In step 40, at time step zero, the prior correspondence matrix is initialized as a non-informative correspondence matrix. This treats all correspondence as equal at the initiation of routine since there are no pre-assumptions of any relationships between any vision targets and any radar targets. This is represented as $\bar{a}_{jk}=\pi_k$, for all j=1, ..., M, and k=1, ..., N+1.

In step 41, a determination is made if a new frame of data has arrived from each of the sensing systems. A data frame includes data from both the radar system ($R_1, R_2, \ldots, R_N$) and the vision system. ($V_1, V_2, \ldots, V_M$). If the determination is made in step 41 that a new frame of data has not arrived, then the routine continues to check for the arrival of a new data frame from both the vision systems and the radar systems. If the determination is made in step 41 that new frame of data has arrived, then the routine proceeds to step 42.

In steps 42, the data frame is analyzed for determining whether a target leaves or enters the field-of-view of either the radar sensor or the vision sensor and adjusts the prior correspondence matrix $\bar{A}$.

In step 43, the data frame is analyzed for determining whether a respective vision target j showed up in the in current target list, but does not show up in the previous target list. If the respective vision target j showed up in the current target list, but is not showing up in the previous target list, then the respective row (i.e., respective vision target j) is initialized as non-informative. This is represented as $\bar{a}_{j'k}=\pi_k$ for all k, where j' is the new added row index.

In step 44, the data frame is analyzed for determining whether a respective radar target k showed up in the previous target list, but does not show up in the current target list. If the respective radar target k showed up in the previous target list, but is not showing up in the current target list, then the respective column (i.e., respective radar target k) is removed from the prior correspondence matrix ($\bar{A}$).

In step 45, the data frame is analyzed for determining whether a respective vision target j showed up in the previous target list, but does not show up in the current target list. If the respective vision target j showed up in the previous target list, but is not showing up in the current target list, then the respective row (i.e., respective vision target j) is removed from the prior correspondence matrix ($\bar{A}$)

In step 46, the data frame is analyzed for determining whether a respective radar target k showed up in the in current target list, but does not show up in the previous target list. If the respective radar target k showed up in the current target list, but is not showing up in the previous target list, then a respective zero-value column is appended in the correspondence matrix ($\bar{A}$).

In step 47, the posterior matrix is computed. The posterior correspondence matrix ($\hat{A}$) is determined using the formula shown in eq. (8) for all j and k.

In step 48, assignments relating to target correspondence are determined based on the posterior correspondence matrix ($\hat{A}$). That is, the column having the largest value closest to 1 is assigned the target correspondence between a respective radar target and a respective vision target (e.g., $$\left(\text{e.g.,} \sum_{k=1}^{N} \hat{a}_{jk} \text{ is equal to 1 or 0}\right).$$

is equal to 1 or 0).

In step 49, the assignments of every vision target to a radar target are output. An index list ($k_1, k_2, \ldots, k_m$) is outputted corresponding to vision targets ($V_1, V_2, \ldots, V_m$). Each element in the index list represents the radar target index to which the vision target is assigned. The j-th vision target $V_j$ is assigned to the $k_j$-th radar target and $k_j=\arg\max_k (\hat{a}_{jk})$.

In step 50, sensor registration is performed. Sensor registration includes removing error and bias of data from the different sets of sensors. This includes minimizing the target matching error between two sensors through estimating a 2D rigid transformation. The transformation between the two sensors is recursively estimated by using the prior value to derive updated value at every time step. This is performed by updating a 2D rigid transformation from T to where T is the past transformation and is the updated transformation. The rigid transformation is determined by the following formula:

$$T=(1-\eta)T+\eta T^*$$

where T* is the current estimate of the transformation based on the matching between the radar targets and vision targets and is computed by the formula $$T^* = \operatorname{argmin}_T \left( \overline{a}_{jk} \frac{\|V_j - T(R_k)\|^2}{2\sigma^2} \right)$$

and the predefined small learning factor ($\eta$) is $0<\eta<1$.

A solution for the transformation T* as shown above may be derived utilizing three parameters: $t_x$, $t_y$, $\epsilon$, of the past transformation. Parameter $t_x$ represents the x-offset from the radar frame to the vision frame, parameter $t_y$ represents the y-offset from the radar frame to the vision frame, and $\epsilon$ represents the angular displacement offset from the radar frame to the vision frame. The transformation parameters are defined by the following two equations:

$$x' = x - \epsilon y + t_x$$

$$y' = \epsilon x - y + t_y.$$

The above formulas transform a point (x, y) to the new position (x', y').

It is assumed that $V_j=(x'_j, y'_j)$ and $R_k=(x_k, y_k)$. $x'_j$ and $y'_j$ are the longitudinal and lateral displacements of the j-th vision targets. $x_k$ and $y_k$ are longitudinal and lateral displacements of the k-th radar targets. T* can then be computed. $T^*=(t^*_x, t^*_y, \epsilon^*)$ and transformation parameters used to derive T* can be computed as follows:

$$t^*_x = \frac{\sum_{j,k} \overline{a}_{j,k}(x'_j + \epsilon y_k - x_k)}{\sum_{j,k} \overline{a}_{j,k}},$$

$$t^*_y = \frac{\sum_{jk} \overline{a}_{jk}(y'_j - \epsilon x_k - y_k)}{\sum_{j,k} \overline{a}_{j,k}},$$

$$\epsilon^* = \frac{\sum_{jk} \overline{a}_{jk}(y'_j - t_y - y_k)x_k + (x'_j - t_x - x_k)y_k}{\sum_{j,k} \overline{a}_{j,k}[x_k^2 + y_k^2]},$$

wherein $\hat{A}=[\hat{a}_{jk}]$ is the posterior matrix, $y'_j$ is a lateral displacement of the j-th vision target, $\epsilon$ angular displacement offset, $y_k$ is the lateral displacement of the k-th radar target, $x'_j$ is the longitudinal displacement of the j-th vision target and $x_k$ is the longitudinal displacement of the k-th radar target.

In step 51, the prior correspondence matrix at the next time step $\overline{A}_{t+1}=[\overline{a}_{jk}]$ is set to the posterior correspondence matrix at the current time step $\hat{A}_t=[\hat{a}_{jk}]$ where $\overline{a}_{jk}=\hat{a}_{jk}$, for all j and k. That is, the computed posterior correspondence matrix at time step t is utilized as input as the prior correspondence matrix for computing the next posterior correspondence matrix for the next time step t+1.

A return is made to step 41 for awaiting a new frame of data and recursively updating the correspondence matrix.

Figure 7:
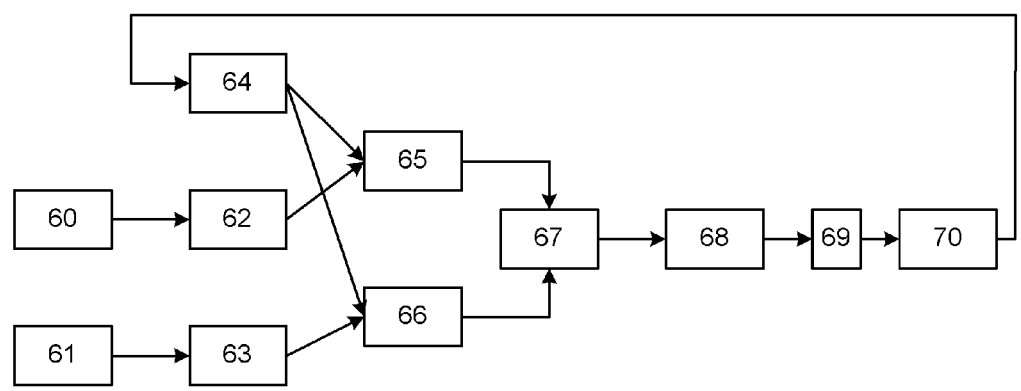
FIG. 7 is a block diagram of a fusion technique incorporating the recursive target association technique.

FIG. 7 illustrates a block diagram of an alternative embodiment integrating the recursive target association technique into a target fusion algorithm.

In block 60, a first object detection system (e.g., radar) senses for objects within the first object detection system's field-of-view. Similarly, in block 61, a second object detection system (e.g., vision) senses for objects within the second object detection system's field-of-view.

In block 62, targets are identified within the first object detection system's field-of-view. For example, the targets relate to objects captured by the radar detection system.

In block 63, targets are identified within the second object detection system's field-of-view. For example, the targets relate to objects captured by the vision detection system.

Both the radar targets 62 and the vision targets 63 are regarded as independent and identical distribution samples.

The data association technique may be used to associate targets from the radar detection system and vision detection system directly as described in FIG. 6. However, the integration technique as described herein utilizes a third variable for integration with the radar target respectively, and utilizes the third variable for integration with the vision target respectively. Thereafter, the results from both integrations are fused.

In block 64, the feedback data as it relates to fused targets from a motion model is utilized as inputs for data association technique with radar targets, respectively, and with vision targets, respectively. The feedback data from the target motion model is identified as a predicted fusion target based on its last known position and motion analysis. Details of the predicted fusion target will be discussed in detail later.

In block 65, detected radar targets 62 and the predicted fusion targets 64 are provided as inputs to a first data association module that utilizes the recursive target association technique. Data association as described in FIG. 6 is applied on the radar targets 62 and the predicted fusion targets 64 for generating a first posterior correspondence matrix.

In block 66, detected vision targets 63 and the predicted fusion targets 64 are provided as inputs to a second data association module that utilizes the recursive target association technique. Data association as described in FIG. 6 is applied on the vision targets 63 and the predicted fusion targets 64 for generating a second posterior correspondence matrix.

In block 67, the outputs from the recursive target association technique in block 65 and the outputs from the recursive target association technique 66 is provided to a fusion system that utilizes a target tracking using sensor fusion. The fusion system fuses data from each posterior correspondence matrix for estimating the location of a given target. A fusion technique that can be used in block 67 is described in U.S. Pat. No. 7,460,951 having an issue date of Dec. 2, 2008, which is herein incorporated by reference in its entirety.

In block 68, the fusion targets are identified from the output of the fusion system in block 67. The fusion targets are modeled as a Gaussian mixture model (GMM) distribution.

In block 69, a delay is applied to the fusion target data prior to proceeding to block 70.

In block 70, a target motion model is applied to the fusion targets. The target motion model utilizes the fusion target data and predicts a future position of the targets based on the last known position and a trajectory of the target. Motion tracking involves locking onto a target and following the object through multiple frames and predicting a path of the target based on the trajectory of the target. In each fusion target, a longitudinal offset (x), a lateral offset (y), a longitudinal speed (v_x), and a lateral speed (v_y) of the target are estimated state variables. Therefore, if the current state of the target is known, then the future state variables at time dT late may be estimated using the following formulas:

$$x' = x + dT v\_x$$

$$y' = y + dT v\_y$$

$$v\_x' = v\_x$$

$$v\_y' = v\_y$$

Therefore, the target motion model transforms a target's current state to its future state s' as represented by the following formula:

$$s' = F(s) + w$$

where w is a random variable of appropriate dimension, typically with a zero mean and a covariance matrix Q.

After a target motion model of the target is generated, a predicted position of the target is determined in block 64 and is used as an input to the data association techniques in blocks 65 and 66.

While certain embodiments of the present invention have been described in detail, those familiar with the art to which this invention relates will recognize various alternative designs and embodiments for practicing the invention as defined by the following claims.

What is claimed is:

1. A method of associating targets from at least two object detection systems, the method being executed by a processor, comprising the steps of:
   generating an initial prior correspondence matrix based on prior target data from a first object detection system and a second object detection system;
   identifying targets in a first field-of-view of the first object detection system based on a current time step;
   identifying targets in a second field-of-view of the second object detection system based on the current time step;
   adjusting the prior correspondence matrix based on respective targets entering and leaving the respective fields-of-view;
   generating a posterior correspondence matrix as a function of the adjusted prior correspondence matrix; and
   identifying a correspondence in the posterior correspondence matrix between a respective target of the first object detection system and a respective target of the second object detection system.

2. The method of claim 1 further comprising the steps of minimizing offsets in a transformation from a coordinate frame of the first field-of-view to a coordinate frame of the second field-of-view.

3. The method of claim 2 wherein the transformation is performed utilizing a rigid transformation, the rigid transformation being determined by the following formula:

$$T' = (1-\eta)T + \eta T^*$$

where T' is an updated transformation, T is a past transformation, T* is a current transformation, and $\eta$ is a learning factor $0 < \eta < 1$.

4. The method of claim 3 wherein the current transformation T* is represented by a coordinate offset $(t^*_x, t^*_y, \epsilon^*)$ where $(t^*_x)$ is an x-coordinate offset, $(t^*_y)$ is a y-coordinate offset, and $(\epsilon^*)$ is an angular displacement offset between the coordinate frame of the first field-of-view and the coordinate frame of the second field-of-view.

5. The method of claim 4 wherein x-coordinate offset $(t^*_x)$ is represented by the following formula:

$$t^*_x = \frac{\sum_{j,k} \hat{a}_{j,k}(x'_j + \epsilon y_k - x_k)}{\sum_{j,k} \hat{a}_{j,k}},$$

wherein $[\hat{a}_{jk}]$ is the posterior matrix, $x'_j$ is a longitudinal displacement of the j-th vision target, $\epsilon$ angular displacement offset, $y_k$ is a lateral displacement of the k-th radar target, and $x_k$ is a longitudinal displacement of the k-th radar target.

6. The method of claim 4 wherein the y-coordinate offset $(t^*_y)$ is represented by the following formula:

$$t^*_y = \frac{\sum_{j,k} \hat{a}_{j,k}(y'_j - \epsilon x_k - y_k)}{\sum_{j,k} \hat{a}_{j,k}},$$

wherein $\hat{a}_{jk}$ is the posterior matrix, $y'_j$ is a lateral displacement of the j-th vision target, $\epsilon$ angular displacement offset, $y_k$ is a lateral displacement of the k-th radar target.

7. The method of claim 4 wherein the angular displacement offset $(\epsilon^*)$ is determined by the following formula:

$$\epsilon^* = \frac{\sum_{j,k} \hat{a}_{j,k}(y'_j - t^*_y - y_k)x_k + (x'_j - t^*_k - x_k)y_k}{\sum_{j,k} \hat{a}_{j,k}[x_k^2 + y_k^2]}$$

wherein $\hat{a}_{jk}$ is the posterior matrix, $y'_j$ is a lateral displacement of the j-th vision target, $\epsilon$ angular displacement offset, $y_k$ is a lateral displacement of the k-th radar target, $x'_k$ is a longitudinal displacement of the j-th vision target, and $x_k$ is the $x_k$ is the longitudinal displacement of the k-th radar target.

8. The method of claim 1 wherein generating the initial prior correspondence matrix includes initializing the prior correspondence matrix as non-informative by setting all correspondence between the targets in the first field-of-view and the targets in the second field-of-view as equal.

9. The method of claim 1 further comprising the steps of:
   setting the prior correspondence matrix equal to the posterior correspondence matrix;
   determining that a new frame of data is available from the first object detection system and the second object detection system for a next time step;
   adjusting the prior correspondence matrix based on targets entering and the leaving the respective field-of-views at the next time step;
   generating a next posterior correspondence matrix as a function of the adjusted prior correspondence matrix for the next time step; and
   identifying a correspondence within the next posterior correspondence matrix between a respective target of the first object detection system and a respective target of the second object detection system for the next time step.

10. The method of claim 1 wherein the steps of adjusting the prior correspondence matrix based on targets entering and leaving the respective field-of-views further comprises the step of:
    determining that a respective target is in the field-of-view of the first object detection system in a previous time step;
    determining that the respective target is not in the field-of-view of the first object detection system in the current time step; and
    removing a respective row in the prior correspondence matrix associated with the respective target of the first object detection system.

11. The method of claim 1 wherein the step of adjusting the prior correspondence matrix based on targets entering and leaving the respective fields-of-view further comprises the steps of:

determining that a respective target is in the field-of-view of the first object detection system in the current time step;

determining that the respective target is not in the field-of-view of the first object detection system in a previous time step; and appending a respective row in the prior correspondence matrix associated with the respective target of the first object detection system.

12. The method of claim 11, wherein the respective row is initialized as non-informative in the prior correspondence matrix by setting all correspondence between the first set of vision targets and the second set vision targets in the respective row as equal.

13. The method of claim 1 wherein the step of adjusting the prior correspondence matrix based on targets entering and leaving the respective fields-of-view further comprises the steps of:

determining that a respective target is in the field-of-view of the second object detection system in a previous time step;

determining that the respective target is not in the field-of-view of the second object detection system in the current time step; and removing a respective column in the prior correspondence matrix associated with the respective target of the second object detection system.

14. The method of claim 1 wherein the step of adjusting the prior correspondence matrix based on targets entering and leaving the respective fields-of-view further comprises the steps of:

determining that a respective target is in the field-of-view of the second object detection system in the current time step;

determining that the respective target is not in the field-of-view of the second object detection system in a previous time step; and appending a respective row in the prior correspondence matrix that is associated with the respective target of the second object detection system.

15. The method of claim 1 wherein the posterior correspondence matrix is determined by the formula:

$$\hat{a}_{jk} = p(A_{jk} = 1 \mid V) = \frac{\overline{a}_{jk}(V_j \mid k)}{\sum_{k=1}^{N+1} \overline{a}_{jk} p(V_j \mid k)}$$

wherein $\hat{a}_{jk}$ is the posterior matrix, $p(V_j|k)$ is the probability that the j-th vision target $V_j$ is associated with the k-th target $R_k$, and $$\frac{1}{\sum_{k=1}^{N+1} \overline{a}_{jk} \cdot p(V_j|k)}$$

is the normalization factor to make $p(A_{jk}=1|V)$ a probability distribution.

16. The method of claim 1 wherein the first object detection system uses radar for detecting targets and the second object detection system uses vision for detecting objects.

17. The method of claim 1 wherein the first object detection system uses radar for detecting targets and the second object detection system uses a predicted target determined from a target motion model, the target motion model determining a predicted position of a target as a function of a last computed posterior correspondence matrix.

18. The method of claim 1 wherein the first object detection system uses vision for detecting targets and the second object detection system uses a predicted target determined from a target motion model, the target motion model determining a predicted position of a target as a function of a last computed posterior correspondence matrix.

19. The method of claim 1 further comprising the steps of:

estimating target positions at a next time step based on a target motion model using corresponding targets identified in the posterior correspondence matrix:

setting the prior correspondence matrix equal to the posterior correspondence matrix;

applying the prior correspondence matrix to a first data association module and a second data association module;

adjusting the prior correspondence matrix applied to the first data association module based on targets leaving and entering the first object detection system at the next time step and based on the predicted targets output from the target motion model;

generating a first posterior correspondence matrix as a function of the adjusted correspondence matrix of the first data association module;

adjusting the prior correspondence matrix applied to the second data association module based on targets leaving and entering the second object detection system at the next time step and based on the predicted targets output from the target motion model;

generating a second posterior correspondence matrix as a function of the adjusted correspondence matrix of the second data association module;

fusing the first posterior correspondence matrix and the second posterior correspondence matrix; and identifying correspondence within the fused posterior correspondence matrix between respective targets identified from the first data association module and the second data association module.

20. The method of claim 19 further comprising the steps of:

generating a time delay after identifying corresponding targets within the fused correspondence matrix; and applying target motion analysis to the corresponding targets for estimating a target position for each of the corresponding targets at a next time step.

* * * * *